UNITED STATES PATENT OFFICE.

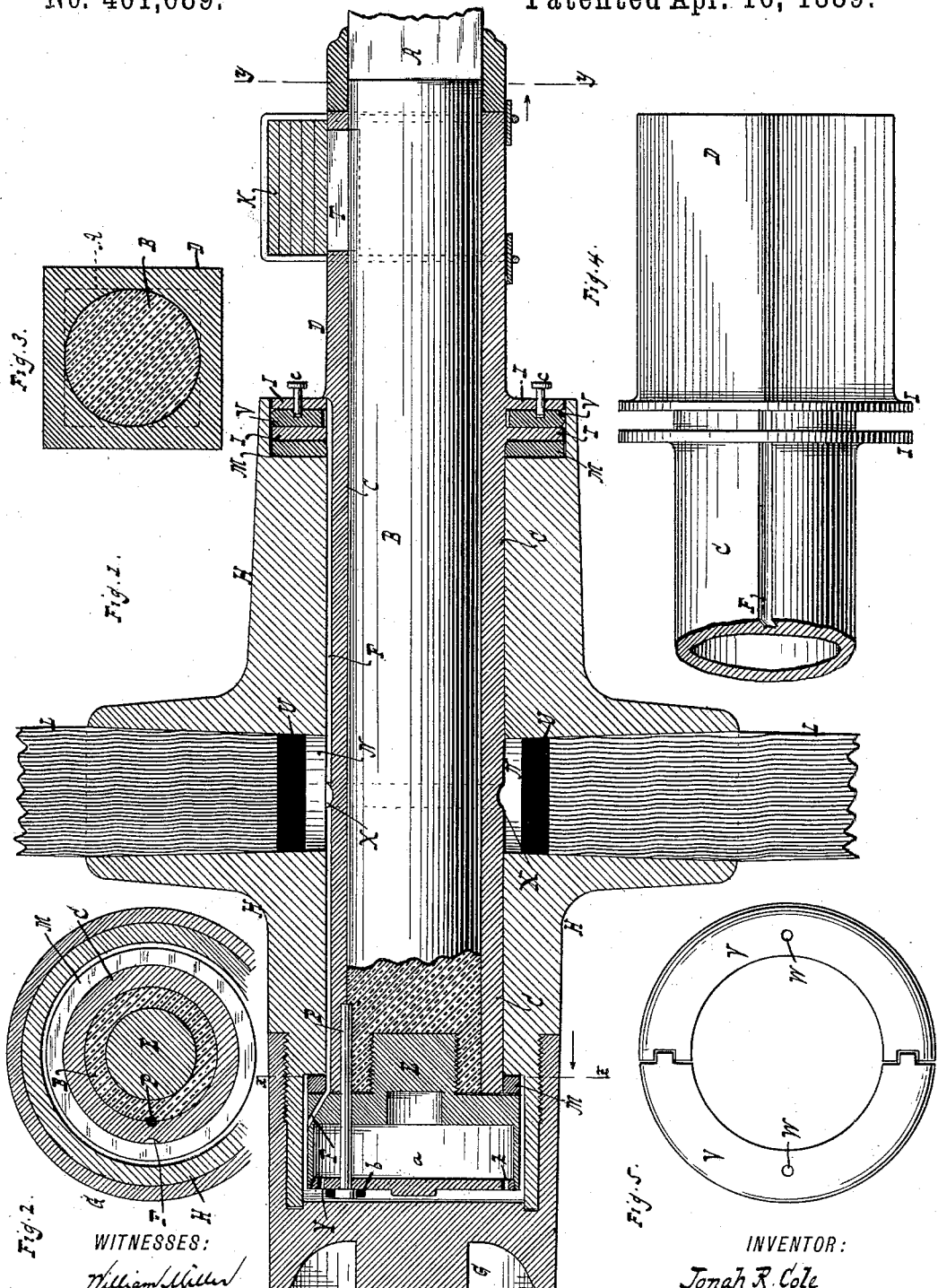

JONAH R. COLE, OF NEW YORK, N. Y.

VEHICLE HUB AND AXLE.

SPECIFICATION forming part of Letters Patent No. 401,689, dated April 16, 1889.

Application filed January 24, 1889. Serial No. 297,422. (No model.)

*To all whom it may concern:*

Be it known that I, JONAH R. COLE, a citizen of the United States, residing at New York, in the county and State of New York, have invented new and useful Improvements in Axles, of which the following is a specification.

This invention relates to an improvement in axles, and by means of this improvement the axle is strengthened, as set forth in the following specification and claims, and illustrated in the accompanying drawings, in which—

Figure 1 is a side elevation of an axle and adjacent parts, partly in section. Fig. 2 is a section along the line $x\ x$, Fig. 1. Fig. 3 is a section along the line $y\ y$, Fig. 1. Fig. 4 is a detail perspective view of part of a sleeve. Fig. 5 is a detail view of a collar.

Similar letters indicate corresponding parts.

In the drawings the invention is shown applied to a wagon or carriage axle.

The letter A indicates the axle-bed of square or angular shape, and having the rounded arm B, provided with the sleeve C. The spring-seat K is adapted to seat a wagon-spring. The portion D of sleeve C, extending from the wheel or hub H under the spring-seat K, is square or angular, as seen in Figs. 3 and 4, and is slotted to receive a tenon, T, on the under side of the spring-seat, as shown in Fig. 1. The spring-seat thus rests on the square portion D of the sleeve C, and is supported thereon through the engagement of the tenon T with the slotted sleeve and with a recess in the axle beneath the slot in the sleeve, a clip being passed around the spring-seat and engaged with the sleeve and axle, as shown in Fig. 1. The sleeve portion D extends under the spring-seat K, as seen in Fig. 1, so that the axle at the point where it is subjected to the pressure of the spring on the seat K has the combined strength of the sleeve and bed. A strong and desirable structure is thus obtained, which is not liable to breakage. The sleeve has a collar made in two parts, I I. This collar is fixed to the sleeve, and between the fixed collar-sections is a rotary collar, V V, which prevents dirt from working in between the hub and sleeve. The rotary collar is made in sections, Fig. 5, and these sections are placed about the sleeve between the sections I I and held in place by pins $c$, passing through holes or eyes in a collar-section, I, and engaging depressions W in the rotary collar-sections V. The pins $c$ hold the sections V in place until the hub is slid onto the sleeve, when the pins $c$ are withdrawn, leaving the collar V free to rotate between the sections I I. Little or no friction is thus generated between the collar V and hub H.

The spokes L are only partly inserted into the hub, so as to leave a space, N, serving as a lubricating-chamber to hold a lubricant. To prevent escape of the lubricant and at the same time to secure a seat for the spokes, so as to prevent the spokes rattling, a cushion, U, of such material as soft rubber, is secured in the hub. The groove X, passing about the sleeve C, forms a channel for the lubricant, so that the lubricant can readily travel about the sleeve and interior of the hub.

The hub is held in place by the nut E, secured to the axle. This nut has a lubricant-chamber, $a$, which can be filled with lubricating material through the supply-opening Y. The lubricant escaping through the opening Z and passing through the oil hole or channel F will enter the groove X, and thus pass about the sleeve to secure thorough lubrication. Washers M at the front and rear of the hub H secure easy movement for the hub.

The nut E, arm B, and sleeve C are locked by the pin P, and the cushions or pads $b$ secure an easy seat for the head of the locking-pin P. The cap G, secured to the hub, prevents the pin P moving out of place.

What I claim as new, and desire to secure by Letters Patent, is—

1. The combination, with an axle, a hub or wheel, and a spring-seat, K, supported by the axle, of a sleeve secured to said axle and extended back beneath said spring-seat, substantially as described.

2. The combination, with an axle and a hub or wheel, of a sleeve, C, secured to the axle and provided at a point between the axle and the inner end of the hub with collars I I, and the rotary collar V, made in two parts and held between the collars I I by the projecting inner end of the hub, substantially as described.

3. The combination, with an axle and a sleeve secured to said axle and provided with grooves F and X, of a hub having a lubricating-chamber, N, communicating with said grooves and located between the spokes and said sleeve, substantially as described.

4. The combination, with an axle, of a hub provided with a lubricating-chamber, N, located between the spokes and the axle, and with a cushion, U, to prevent escape of the lubricant and to secure a firm seat for the spokes, substantially as described.

5. The combination, with an axle and a hub or wheel, of a retaining-nut, E, for said hub, said nut being provided with a lubricant-chamber, $a$, and with a supply-opening, Y, and outlet Z for said chamber, and said axle having a channel, F, for leading the lubricant to the hub, substantially as described.

6. The combination, with an axle and a hub or wheel, of a sleeve for said axle, a nut, E, for retaining the hub in place, and a key, P, for locking the nut, the sleeve, and the axle, substantially as described.

7. The combination, with an axle and a hub or wheel, of a sleeve for said axle, a nut, E, for retaining the hub in place, and a key, P, for locking the nut, the sleeve, and the axle, said nut being provided with washers or cushions $b$ for the key, substantially as described.

In testimony whereof I have hereunto set my hand and seal in the presence of two subscribing witnesses.

JONAH R. COLE. [L. S.]

Witnesses:
J. VAN SANTVOORD,
ERNST F. KASTENHUBER.